Figure 1:
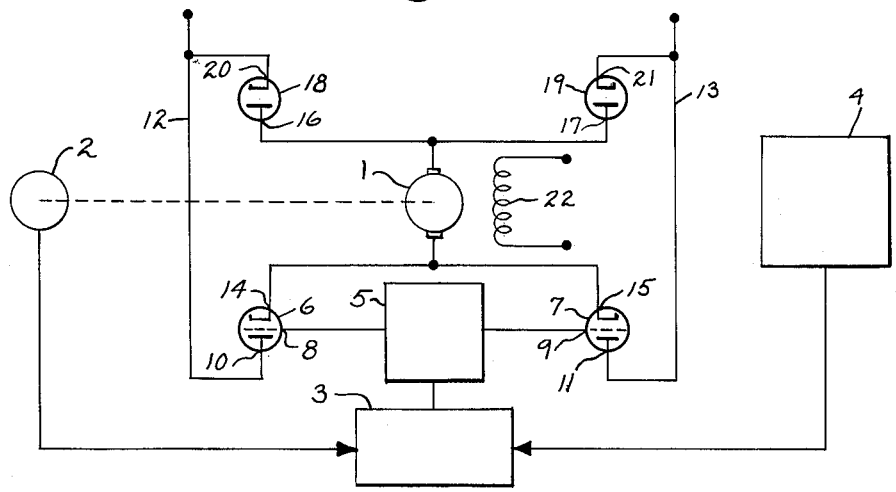

Feb. 15, 1966 J. E. CALLAN 3,235,751
TIME RATE DELAY CIRCUIT HAVING CONTROLLED CHARGE AND DISCHARGE
Filed Sept. 13, 1962

INVENTOR
JOHN E. CALLAN

BY Thomas O. Kloehn

ATTORNEY

United States Patent Office 3,235,751
Patented Feb. 15, 1966

3,235,751
TIME RATE DELAY CIRCUIT HAVING CONTROLLED CHARGE AND DISCHARGE
John E. Callan, Milwaukee, Wis., assignor to Allen-Bradley Company, Milwaukee, Wis., a corporation of Wisconsin
Filed Sept. 13, 1962, Ser. No. 223,430
3 Claims. (Cl. 307—88.5)

The present invention relates to direct current motor speed control; and more particularly it relates to a time rate delay circuit which functions to provide a precisely controllable rate of change of voltage for controlling the acceleration or deceleration of a direct current motor, said time rate delay circuit including a transistor having a direct current control signal fed to its base section, a source of collector current connected to said transistor, and an output capacitor connected to have its charge rate varied according to the predetermined rate of flow of collector current in said transistor.

A time rate delay circuit is commonly used with a direct current motor during acceleration to control its torque commensurate with its load. A controlled rate of motor acceleration and deceleration, respectively, may be required by the machine or process which the motor is actuating, or it may be necessary to protect the motor. For example, where a direct current motor is used to drive a heavy industrial machine, it may not be practical to make the motor large enough to overcome the inertia of the machine instantaneously. In order to avoid burning out the motor, it becomes necessary to increase the armature voltage to the motor, and thus its speed gradually, as the motor is able to surmount the inertia of the machine it is activating. Similarly, during deceleration of the machine, although its inertia may aid the motor, more desirable motor utilization may be obtained if the decrease in speed is gradual, rather than an abrupt cut-off.

Therefore, time rate delay circuits were developed to control the rate of increase of power fed to electric motors, and commonly such circuits consisted of a controlled means for charging an output capacitor at a substantially constant rate. The rate of charge of the output capacitor would then be reflected as a linear output signal, referred to as a "ramp signal." Such a ramp signal might be used to control an amplifier, the output of which could drive an electric motor.

In the past the arrangements used in a time rate delay circuit for charging an output capacitor at a predetermined constant rate have frequently employed pentode vacuum tubes or complicated combinations of numerous transistors. The power requirements, heat dissipation problems, and physical size of vacuum tubes make their use less than desirable in time rate delay circuits. The complexity of previous transistor circuits, with the resultant unreliability, has reduced their effectiveness. Moreover, in the past such time rate delay circuits frequently provided no control for deceleration of the motor, and such control may be equally as important as that for the acceleration of the motor. Commonly, the time rate delay circuits used in the past have been unable to delay the rate of acceleration for a period longer than twenty seconds.

By contrast, the present invention may accomplish a time rate delay over a period up to 100 seconds, for both acceleration and deceleration, by means of two transistors. That is accomplished by connecting an input signal from a switch, rheostat, or the like to a collector section of one of the transistors and connecting the emitter section of that transistor to charge an output capacitor at a rate controlled by the bias of the transistor's base section. The discharge of the output capacitor is controlled by connecting a collector section of the other transistor to one side of the capacitor and the emitter section to the other side of the capacitor and controlling the flow of discharge current through the transistor by controlling the bias of its base section. Each of the two transistors is in common emitter connection and each has its own variable control voltage connected to its base section, so that the charging rate and discharging rate may be independently and precisely controlled. As a result, a time rate delay circuit embodying the present invention will be characterized by a minimum of components, and a high degree of reliability and versatility.

It should be pointed out that the utility of the present invention is not confined to its application in D.C. motor speed controls. A time rate delay circuit embodying the present invention will produce a high quality, linear, ramp signal having a slope that may be varied over a wide range. Such a signal has many uses. For example, it may be used in testing signal control devices. It is also useful in designing servomechanisms. Moreover, the facility of adjustment provided by the present invention permits the use of its highly linear response, not only where a ramp signal is desired, but where any other configuration might be wanted. A circuit embodying the present invention may be used, for example, wherever it may be desired to produce the integral of an input or control signal. These, and other uses, equally remote from D.C. motor speed controls, gives this invention a broad range of utility.

Accordingly, it is an object of the present invention to provide an improved time rate delay circuit.

It is another object of the present invention to provide a time rate delay circuit which does not employ vacuum tubes.

It is another object of the present invention to provide a time rate delay circuit capable of delaying acceleration of a direct current motor up to a period of 100 seconds.

It is another object of the present invention to provide a high quality time rate delay circuit employing a minimum number of circuit components.

It is another object of the present invention to provide a highly reliable time rate delay circuit.

It is another object of the present invention to provide a ramp signal generator having a high degree of versatility.

It is another object of the present invention to provide a readily adjustable, versatile signal generator producing a highly linear response to a control signal.

The foregoing and other objects and advantages will appear from the description to follow. In the description, reference is made to the accompanying drawing which forms a part hereof and in which there is shown by way of illustration a specific embodiment in which this invention may be practiced. This embodiment will be described in sufficient detail to enable those skilled in the art to practice this invention, but it is to be understood that other embodiments of the invention may be used and that structural changes may be made in the embodiment described without departing from the scope of the invention. Consequently, the following detailed description is not to be taken in a limiting sense; instead, the scope of the present invention is best defined by the appended claims.

Figure 2:
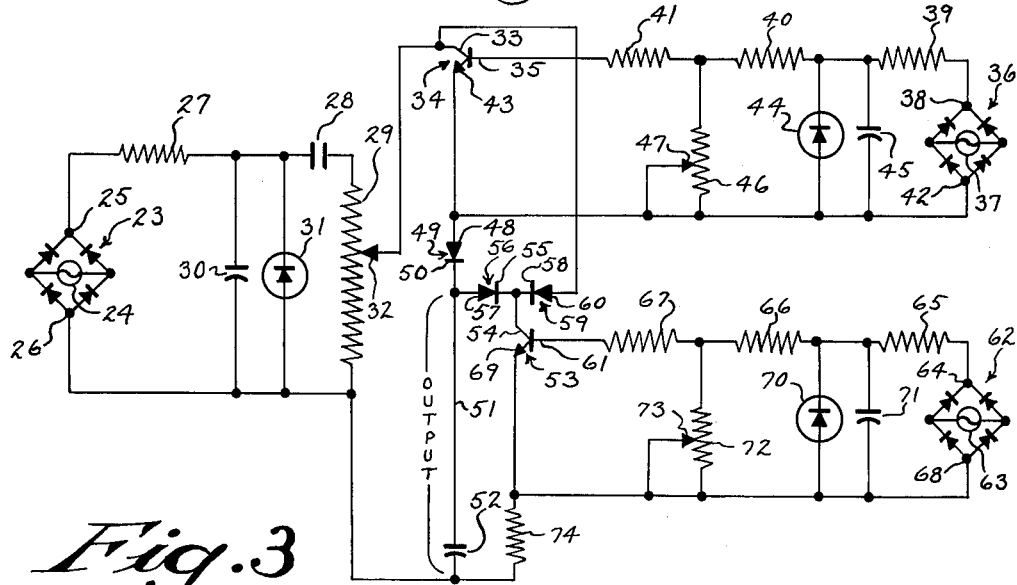
Figure 3:
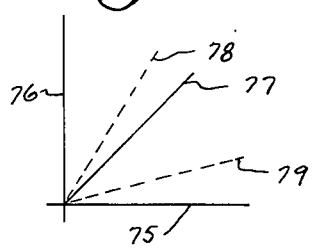

In the drawing:

FIG. 1 is a block diagram of a motor control circuit containing the present invention, FIG. 2 is a wiring diagram of the preferred embodiment of the present invention, FIG. 3 is a graphical representation of the output signal from the embodiment of the present invention shown in FIG. 2.

Referring now specifically to the drawings, FIG. 1 is a block diagram of a typical motor control circuit employing the present invention. A direct current motor armature 1 is mechanically connected to a tachometer 2. The tachometer 2 output signal, reflecting the speed of the D.C. motor 1, is fed into a speed selector circuit 3. A time rate delay circuit 4 of the present invention also feeds its output signal into the speed selector circuit 3. The speed selector circuit 3 is one of the commercially available, well known types, and it functions to compare the output signal from the tachometer 2 with the output signal from the time rate delay circuit 4, transmitting an appropriate error signal representing the difference between the tachometer 2 output and the time rate delay circuit 4 output to a grid control circuit 5 of a well known type.

A pair of grid controlled rectifier tubes 6 and 7 have their grids 8 and 9, respectively, connected to receive the output signal from the grid control circuit 5. The plates 10 and 11 of the grid controlled rectifier tubes 6 and 7 are connected to the two sides of the power lines 12 and 13, respectively. The cathodes 14 and 15 of grid controlled rectifier tubes 6 and 7 are connected to one side of the D.C. motor armature 1.

The other side of the D.C. motor armature 1 is connected to the plates 16 and 17 of a pair of diode rectifier tubes 18 and 19 which have their cathodes 20 and 21 connected to either of the two sides of the power lines 12 and 13, respectively. A field winding 22 is connected to be energized by an appropriate source (not shown).

The operation of this block diagram is apparent. When the output signals from the tachometer 2 and the time rate delay circuit 4 are compared in a speed selector circuit 3, an appropriate signal is sent to the grid control circuit 5, representing the difference between the two output signals. The grid control circuit 5 drives the grids 9 and 10 of the grid controlled rectifier tubes 6 and 7. The signals on the grids 9 and 10 cause the grid controlled recitifier tubes 6 and 7 to fire during an appropriate part of their respective cycles to increase or decrease the speed of the D.C. motor 1, according to the command of the signal from the time rate delay circuit.

Such a time rate delay circuit 4 embodying the present invention is diagramed in FIG. 2. Power for an input signal is supplied by a bridge rectifier 23 fed from an alternating current source 24. Output terminals 25 and 26 of the bridge rectifier 23 are connected through a resistor 27 and a control switch 28 across an input potentiometer 29. A filter capacitor 30 and a zener diode 31 are connected in parallel with the contact 28 and input potentiometer 29 series circuit and with the resistor 27 and the output terminals 25 and 26 of the bridge rectifier 23 series circuit to filter out ripple in the rectifier 23 output voltage, and to present a high quality, substantially constant, direct current voltage to the input potentiometer 29. The input potentiometer's 29 sliding contact 32 is connected to a collector section 33 of an NPN type capacitor charging transistor 34.

The capacitor charging transistor 34 is controlled by the charge on its base 35. The source of direct current control signal is a charge control bridge rectifier 36 which is energized by an A.C. source 37. A positive output terminal 38 of the bridge rectifier 36 is connected through a filter resistor 39 and two other resistors 40 and 41 to the base 35 of the transistor 34, and a negative output 42 terminal of the rectifier 36 is connected to an emitter 43. A filter capacitor 45 and a zener diode 44 are connected in parallel with each other from a point between the resistors 39 and 40 to the negative output terminal 42 of the bridge rectifier 36 to reduce the ripple and to regulate the voltage, so that a continuous, substantial constant direct current signal may be supplied to the base 35 of the transistor 34. A charge rate control potentiometer 46 for controlling the magnitude of the control signal is connected across the output terminals 38 and 42 of the bridge rectifier 36 in series with the resistors 39 and 40, and a sliding contact 47 of the potentiometer 46 is connected to the negative terminal 42 of the rectifier 36, and in conjunction with the resistor 40, it serves as a voltage divider circuit.

The emitter 43 of the charging transistor 34 is connected to an anode 48 of a blocking diode 49. A cathode 50 of the blocking diode 49 is connected by a lead wire 51 to one plate of an output capacitor 52. The other plate of the output capacitor 52 is connected to the negative end of the input potentiometer 29.

A discharge path for the output capacitor is formed through an NPN discharge transistor 53. A collector 54 of the discharge transistor 53 is connected to a cathode 55 of a charge blocking diode 56. The blocking diode 56, in turn, has its anode 57 connected to the lead wire 51, and thus to the output capacitor 52. The collector 54 is also connected to a cathode 58 of abiasing diode 59, and an anode 60 of which is connected to the sliding contact 32 of the input potentiometer 29.

The conductance of the capacitor discharge transistor 53 is controlled by the signal on its base 61. The source of control signal for the base 61 is a bridge rectifier 62 with its alternating current source 63. A positive output terminal 64 of the bridge rectifier 62 is connected through the filter resistor 65 and two current limiting resistors 66 and 67 to the base 61 of the capacitor discharge transistor 53. A negative output terminal 68 of the bridge rectifier 62 is connected to an emitter 69 of the transistor 53. A zener diode rectifier 70 and filter capacitor 71 are connected in parallel with each other from a point between the filter resistor 65 and the current limiting resistor 66 to the negative output terminal 68 of the bridge rectifier 62 to reduce the ripple and to regulate voltage so that a continuous, substantially constant direct current signal may be supplied to the base 61 of the transistor 53. A discharge rate control potentiometer 72 is also connected across the output of the bridge rectifier 62 through the resistors 65 and 66, and in conjunction with the current limiting resistor 66 it acts as a voltage divider to permit adjustment of the magnitude of the control current, and thus to adjust the conductivity of the discharge transistor 53. A sliding contact 73 on the control potentiometer 72 is connected to the negative output terminal 68 of the bridge rectifier 62. The emitter 69 of the transistor 53 is connected to the negative end of the input potentiometer 29 and the output capacitor 52 through a stabilizing resistor 74.

When the time rate delay circuit is operated to accelerate a motor, the normally open contacts of the control switch 28 are closed and the desired charge voltage for the output capacitor 52 is set by positioning the sliding contact 32 of the input potentiometer 29. The input signal from the sliding contact 32 will be fed to the collector 33 of the capacitor charging transistor 34. Since the rate of current flow in the collector 33 may be determined by the amount of current flowing in the base 35, the charge rate control potentiometer 46 may be set to permit a predetermined rate of collector current flow by shunting out a portion of the output of the charge control bridge rectifier 36 through the potentiometer's 46 slider 47. This having been done, the capacitor charging current will flow from the collector 33 through the emitter 43 and the blocking diode 49 to charge the output capacitor at a constant, predetermined rate.

When the normally open contacts of the control switch 28 are open, the capacitor charging current is barred from flowing through the discharge transistor 53 by a current gate made up of the combination of the charge blocking diode 56 and the biasing diode 59. Although the charge blocking diode 56 would appear to present a low resistance path to the flow of charge current, it is in fact biased in the opposite direction by the charge from the sliding contact 32 of the input signal potentiometer 29 conducted through the biasing diode 59. Due to losses in the capacitor charge transistor 34, the charge on the cathode 55 of the charge blocking diode 56 will always be higher than that on its anode 57. Hence, the charge blocking diode 56 is always non-conductive when the output capacitor 52 is being charged. In summary, the current gate blocks the flow of current through the discharge path whenever the normally open switch 28 is closed, but when the switch 28 is in its normal open condition, there is no reverse biasing potential on the blocking diode 56 so the current gate presents a low impedance path for capacitor discharge current.

Since the charging rate of the output capacitor 52 will be constant as a result of the transistor 34 action, the output signal across the output capacitor 52 will appear as a substantially perfectly linear ramp signal as presented in FIG. 3. In the drawing, time is represented on the abscissa 75 and voltage is graphed on the ordinate 76. The rate of charge of the capacitor appears as a solid line 77. Clearly, the slope of that line 77 may be varied by increasing or decreasing the conductivity of the transistor. Other possibilities are graphically suggested by the broken lines 78 and 79.

The capacitor discharge circuit operates in a manner analogous to the capacitor charging circuit. The normally open contacts of the control switch 28 isolate the input signal source, which includes the rectifier 23 and associated circuitry described above, from the biasing diode 59 and the blocking diode 56. As a result, the blocking diode 56 is not reverse biased and will conduct a current entering from its anode 57, but the biasing diode 59 will block any current conducted by the blocking diode 56, leaving the discharge transistor 53 as the only path available for such current. The output capacitor 52 will discharge through the charge blocking diode 56 to the collector 54 of the capacitor discharge transistor 53. The rate at which this collector current will flow may be determined by the discharge control rate potentiometer 72 operating to control the amount of current flowing through the base 61 from the discharge control rectifier 62. The capacitor discharge current passing through the collector 54 and out of the emitter 69 will continue down through the stabilizing resistor 74 to the opposite plate of the output capacitor 52.

The minimization of elements achieved by the present invention is striking. The nature of the sources of controlled direct current being outside the invention, it may be seen that the above-described embodiment requires only two transistors, a capacitor and three diodes to perform all its intended functions with greatest efficiency. Such a circuit is physically compact, has minimal power requirements and proportionally small heat dissipation problems. The importance of the reliability inherent in the minimization of the number of circuit components cannot be stressed too much. The present invention combines the minimization of the number of components with a selection of particularly stable, long-lived and reliable components to achieve a superior result.

The operating capabilities of a circuit embodying the present invention are surprisingly broad and accurate, notwithstanding the avoidance of circuit complexities. The present invention produces a linear output signal of very high quality, since the flow of current through the transistors 34 and 53 may be almost perfectly constant. Moreover, the rate of charge of the capacitor 52, in other words, the slope of the output 77, may be controlled with the utmost precision, limited only by the controllability of the signals placed on the base 35 of the transistors 34.

Although the embodiment described uses NPN type transistors it will be apparent to one skilled in the art that the circuit may easily be adapted to use PNP type transistors. Also, while the present embodiment shows the transistors 34 and 53 arranged in the most efficient as well as the conventional manner, the known bidirectional characteristic of transistors makes it possible to reverse the arrangement of the transistors 34 and 53 while preserving an operable, albeit less efficient, form of the present invention. Finally, it is also evident that where it is not desired to control the discharge of the capacitor 52, the transistor 53 and the three diodes 49, 56 and 59 may be eliminated. Accordingly, it is intended that the scope of this invention not be determined by these and other variations in its embodiments, but by the following claims.

I claim:

1. A time rate delay circuit for controlling the output of a power supply, said circuit comprising the combination of
    a capacitor which may be charged to develop an output voltage;
    a unidirectional source for charging said capacitor;
    a charging path for said capacitor connecting said capacitor across said source and including in series connection a switch means, a transistor with its collector-emitter electrode in series with said capacitor and its base connected to a constant current bias source to bias it in a constantly conductive state and a discharge blocking diode between said transistor and said capacitor and oriented to conduct current from said transistor to said capacitor;
    a discharging path for said capacitor connected across said capacitor and including a charge current blocking diode having an anode and a cathode and being oriented to conduct discharge current from said capacitor;
    and a reverse biasing path including a discharge blocking diode having a cathode connected to said cathode of said blocking diode and an anode connected to said source through said switch means, said discharge blocking diode controlling capacitor discharge in response to said switch means.

2. A time rate delay circuit for controlling the output of a power supply, said circuit comprising the combination of
    a capacitor which may be charged to develop an output voltage;
    a unidirectional source for charging said capacitor;
    a capacitor charging path connecting said capacitor across said source and including in series connection a switch means and a discharge blocking diode oriented to conduct charging current to said capacitor;
    a capacitor discharging path connected across said capacitor and including in series connection a charge current blocking diode connected to conduct discharge current and a discharge rate control transistor having its collector-emitter circuit in series with said capacitor and a constant current biasing source connected to its base to bias it in a constantly conductive state at a predetermined level of conductivity;
    and a reverse biasing path connecting said charge current blocking diode to said source through said switch means to reverse bias said charge current blocking diode when said switch means complete a circuit to said source, and containing a diode to block conduction of capacitor discharge current through said reverse biasing path.

3. A time rate delay circuit for controlling the output of a power supply, said current comprising the combination of
    a capacitor chargeable to produce an output voltage across its plates;
    a unidirectional current source providing power for charging said capacitor;
    a charge path connecting said capacitor across said source and including in series connection a switch means, a charge rate control transistor having its emitter-collector circuit in series with said capacitor and a constant current biasing source connected to its base section to bias it in a constantly conductive state at a predetermined level of conductivity and a discharge blocking diode oriented to conduct charging current;

a discharge path connected across said capacitor including in series connection a charging current blocking diode and a discharge rate control transistor with its emitter-collector circuit in series with said capacitor and a constant current biasing source connected to said base to bias said transistor in constantly conductive state at a predetermined level of conductivity;

and a reverse biasing path connecting said charge current blocking diode to said source through said switch means to reverse bias said charge current blocking diode when said switch means complete a circuit to said source, and containing a diode to block conduction of capacitor discharge current through said reverse biasing path.

References Cited by the Examiner

UNITED STATES PATENTS

| 2,740,888 | 4/1956 | Zukin | 307—88.5 |
| 2,880,332 | 3/1959 | Wanlass | 307—88.5 |
| 2,957,090 | 10/1960 | Hamilton | 307—88.5 |
| 3,061,800 | 10/1962 | Matzen | 307—88.5 |
| 3,140,428 | 7/1964 | Shepard | 317—148.5 |

FOREIGN PATENTS

| 869,862 | 6/1961 | Great Britain. |

ARTHUR GAUSS, *Primary Examiner.*